(12) United States Patent
Goller et al.

(10) Patent No.: US 9,073,771 B2
(45) Date of Patent: Jul. 7, 2015

(54) INTEGRAL CAPSULE FOR BLISTER SUPPRESSION IN MOLTEN GLASS

(75) Inventors: Martin Herbert Goller, Painted Post, NY (US); David Myron Lineman, Painted Post, NY (US); Randy Dean Ziegenhagen, Elmira, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 13/524,558

(22) Filed: Jun. 15, 2012

(65) Prior Publication Data

US 2013/0333420 A1 Dec. 19, 2013

(51) Int. Cl.
*C03B 5/16* (2006.01)
*C03B 17/04* (2006.01)
*C03B 5/167* (2006.01)
*C03B 5/187* (2006.01)
*C03B 5/43* (2006.01)
*C03B 7/02* (2006.01)
*C03B 17/06* (2006.01)

(52) U.S. Cl.
CPC . *C03B 5/16* (2013.01); *C03B 17/04* (2013.01); *C03B 5/1675* (2013.01); *C03B 5/187* (2013.01); *C03B 5/43* (2013.01); *C03B 7/02* (2013.01); *C03B 17/064* (2013.01)

(58) Field of Classification Search
CPC ........ C03B 17/04; C03B 5/04; C03B 5/1675; C03B 5/43; C03B 5/187
USPC ......... 65/32.1, 157, 32.5, 134.1, 134.4, 134.9
See application file for complete search history.

(56) References Cited

U.S. PATENT DOCUMENTS

| | | | | |
|---|---|---|---|---|
| 813,918 | A * | 2/1906 | Schmitz | 165/141 |
| 1,930,285 | A * | 10/1933 | Robinson | 138/143 |
| 2,259,433 | A * | 10/1941 | Kitto | 165/154 |
| 2,679,867 | A * | 6/1954 | Epstein | 285/123.16 |
| 2,756,032 | A * | 7/1956 | Dowell | 165/121 |
| 4,619,292 | A * | 10/1986 | Harwood | 138/113 |
| 4,656,713 | A * | 4/1987 | Rosa et al. | 29/890.08 |
| 4,726,831 | A * | 2/1988 | Fogle et al. | 65/135.6 |
| 4,983,198 | A * | 1/1991 | Ogino | 65/32.5 |
| 5,785,726 | A | 7/1998 | Dorfeld et al. | 65/134.1 |
| 5,851,258 | A * | 12/1998 | Ando et al. | 65/329 |
| 6,250,111 | B1 * | 6/2001 | Murakami et al. | 65/134.9 |

(Continued)

FOREIGN PATENT DOCUMENTS

| | | | |
|---|---|---|---|
| KR | 10-2007-0091601 | 9/2007 | C03B 5/16 |
| KR | 10-2010-0037990 | 4/2010 | C03B 18/16 |

OTHER PUBLICATIONS

PCT Application No. PCT/US2013/045304, Filed Jun. 12, 2013, International Search Report.

*Primary Examiner* — Jason L Lazorcik
(74) *Attorney, Agent, or Firm* — Ryan T. Hardee

(57) ABSTRACT

A precious metal structure which has an internal gas permeable membrane is described herein for a glass manufacturing vessel configured to have molten glass flow therein. The internal gas permeable membrane can be supplied with an atmosphere of gas (or gases) to control the flux of hydrogen into our out of the molten glass or otherwise improve the production of the molten glass. In this manner, the undesirable detrimental reactions that can occur at the interface of the molten glass and precious metal interface which can cause defects in the molten glass such as bubbles or solid inclusions can be stopped or at least substantially reduced.

18 Claims, 12 Drawing Sheets

(56) References Cited

U.S. PATENT DOCUMENTS

| | | | |
|---|---|---|---|
| 7,007,515 B2* | 3/2006 | Dick et al. | 65/346 |
| 7,475,568 B2 | 1/2009 | Bookbinder et al. | 65/134.9 |
| 7,628,037 B2* | 12/2009 | Lautenschlaeger et al. | 65/29.12 |
| 7,628,038 B2* | 12/2009 | DeAngelis et al. | 65/134.1 |
| 7,628,039 B2* | 12/2009 | DeAngelis et al. | 65/157 |
| 7,735,340 B2 | 6/2010 | Burdette et al. | 65/135.2 |
| 8,240,170 B2* | 8/2012 | De Angelis et al. | 65/157 |
| 8,337,946 B2* | 12/2012 | Ott et al. | 427/193 |
| 8,375,747 B2* | 2/2013 | De Angelis et al. | 65/126 |
| 8,375,748 B2* | 2/2013 | Nakane | 65/374.11 |
| 8,448,469 B2 | 5/2013 | Na et al. | 65/99.4 |
| 8,607,591 B2* | 12/2013 | Lautenschlaeger et al. | 65/157 |
| 2003/0029909 A1 | 2/2003 | Bewlay et al. | 228/246 |
| 2004/0177649 A1 | 9/2004 | Dorfeld et al. | 65/90 |
| 2005/0050923 A1* | 3/2005 | Grzesik et al. | 65/135.6 |
| 2005/0274488 A1 | 12/2005 | Wu | 165/80.2 |
| 2006/0086146 A1* | 4/2006 | Grzesik et al. | 65/376 |
| 2007/0149380 A1* | 6/2007 | Dorfeld et al. | 501/55 |
| 2008/0057275 A1 | 3/2008 | Grzesik et al. | 428/195.1 |
| 2009/0038342 A1 | 2/2009 | Pitbladdo | 65/27 |
| 2010/0199721 A1 | 8/2010 | Antoine et al. | 65/134.9 |
| 2011/0113827 A1 | 5/2011 | DeAngelis et al. | 65/29.14 |
| 2011/0138858 A1 | 6/2011 | Dorfeld et al. | 65/29.15 |
| 2011/0203321 A1* | 8/2011 | De Angelis et al. | 65/45 |

* cited by examiner

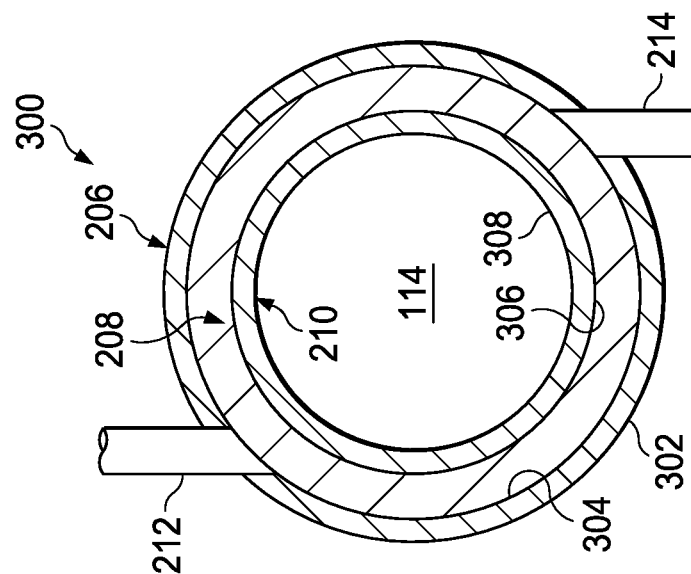
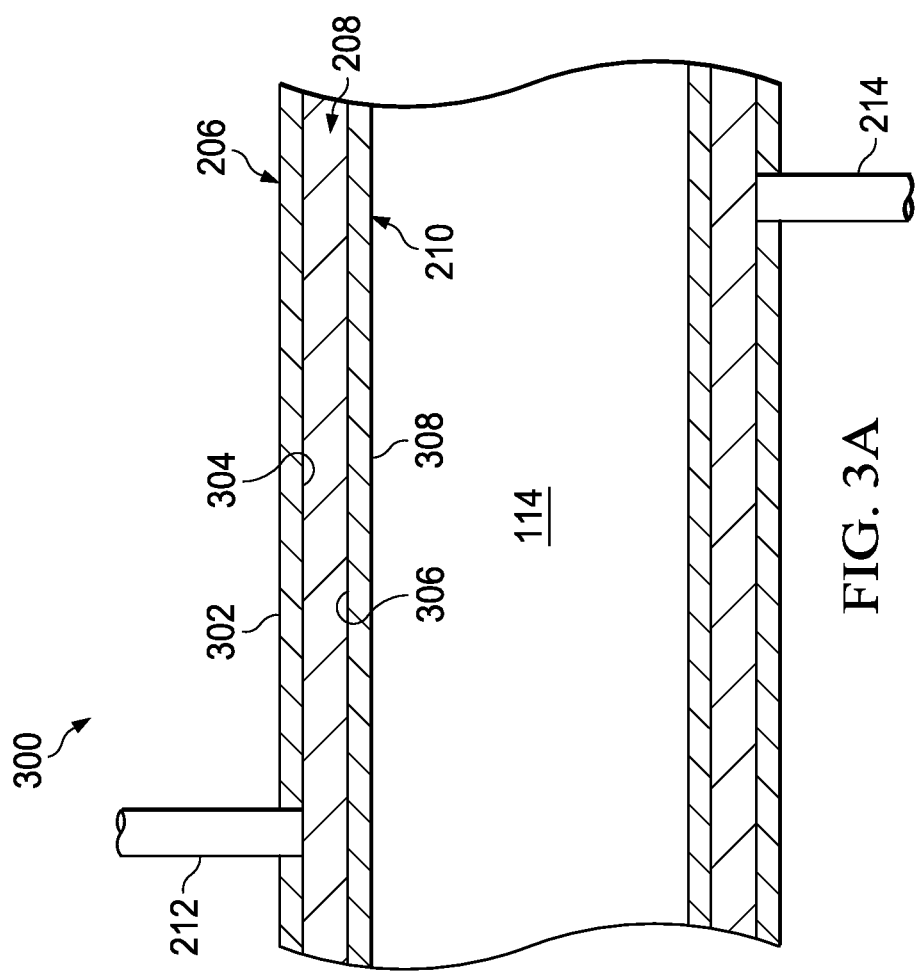
FIG. 3B
FIG. 3A

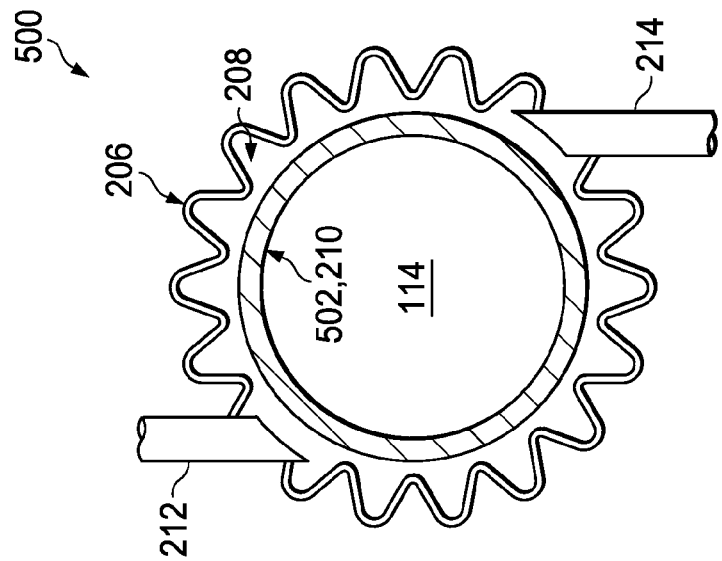
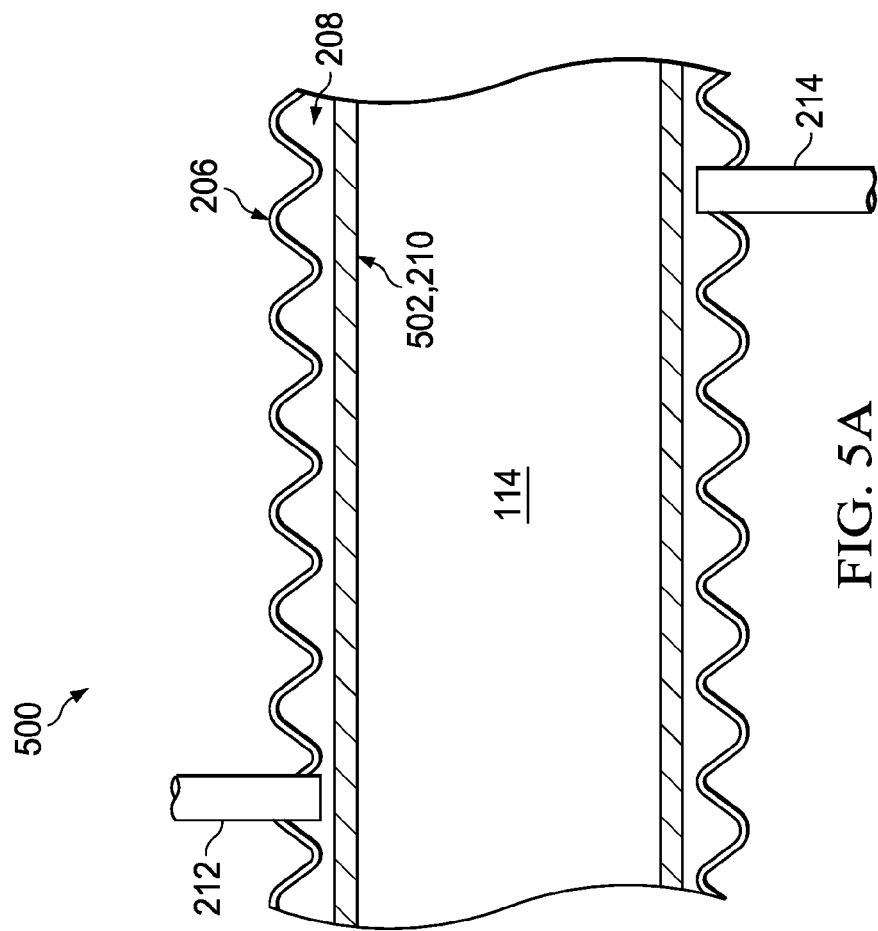

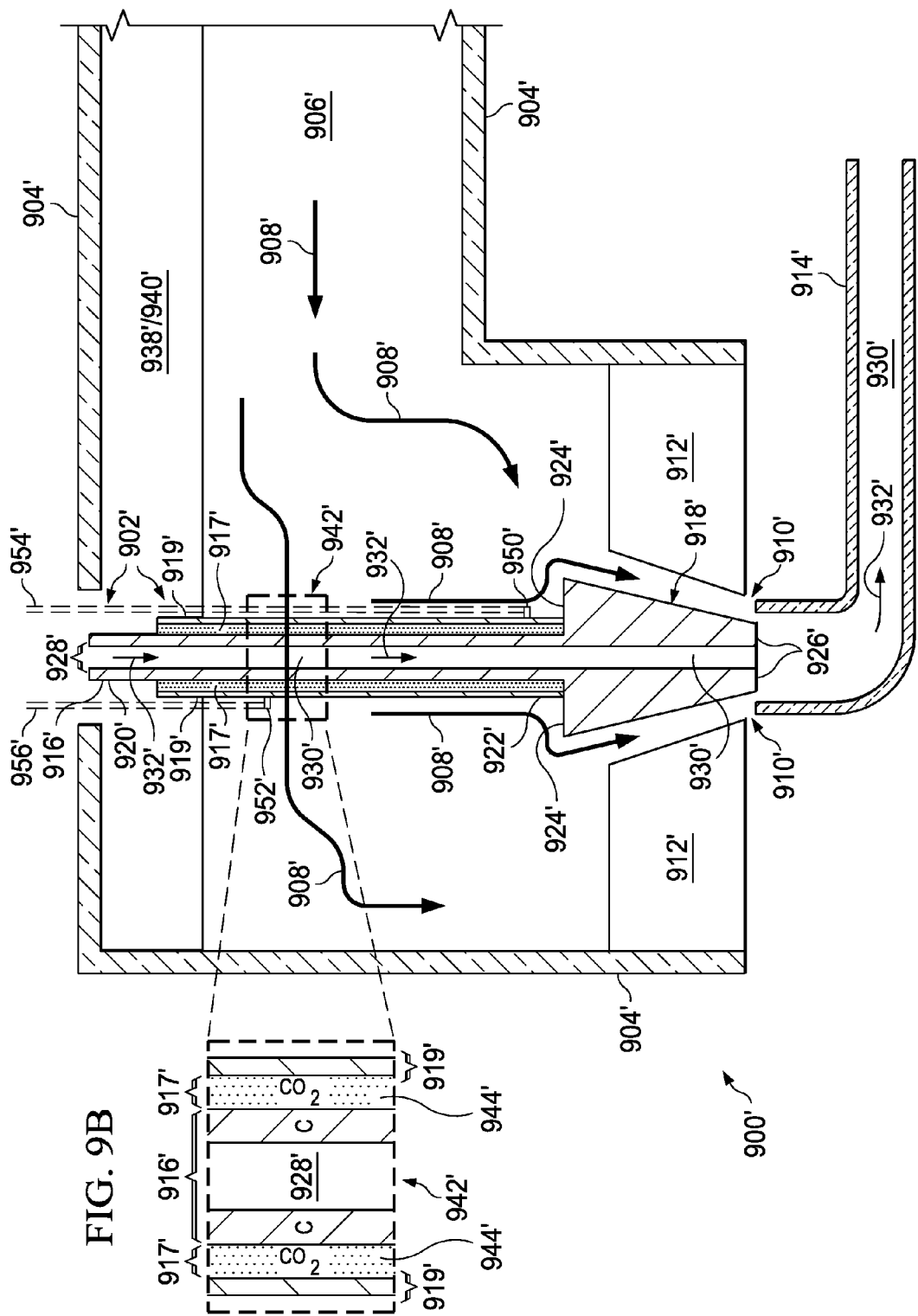

INTEGRAL CAPSULE FOR BLISTER SUPPRESSION IN MOLTEN GLASS

TECHNICAL FIELD

The present invention relates to a glass manufacturing vessel, glass manufacturing systems, methods for producing a glass sheet or glass article, and a method for fabricating the glass manufacturing vessel. The glass manufacturing vessel is configured to have molten glass flow therein. Plus, the glass manufacturing vessel includes an external layer, an intermediate layer, and an internal layer, where the intermediate layer is positioned between the external layer and the internal layer, and where the intermediate layer has a gas permeable structure that permits an atmosphere of gas to pass therein between the external layer and the internal layer. For example, the atmosphere of gas can be such to maintain a positive pressure within open spaces of the intermediate layer and to suppress blister formation within the molten glass. In addition, the present invention relates to a device (e.g., bell device, stirrer, thermocouple, level probe) configured to be partially inserted into molten glass. Furthermore, the present invention relates to a system which incorporates a bell device for manufacturing glass tubing.

BACKGROUND

A wide variety of devices such as Liquid Crystal Displays (LCDs), smart phones, tablet computers utilize flat glass sheets. A preferred technique for manufacturing these flat glass sheets is the fusion process. In the fusion process, the glass sheets are made by using glass manufacturing vessels that contain precious metals, e.g. platinum or platinum alloys. The precious metals are generally considered to be inert in relation to most glasses, and thus should not cause any inclusions in the glass sheets. However, this is not necessarily valid.

There are oxidation reactions that occur at the metal/glass interface inside the glass manufacturing vessel which leads to the generation of gaseous inclusions in the molten glass and thus the glass sheet. One of the more common oxidation reactions that occur at the metal/glass interface is the conversion of negatively charged oxygen ions to molecular oxygen which is caused by the thermal breakdown of water and hydroxyl species in the molten glass. This phenomenon occurs because at the elevated temperatures of glass melting and delivery, a low partial pressure of hydrogen exists in the molten glass. Thus, when hydrogen comes in contact with the precious metal vessel containing the molten glass, the hydrogen rapidly permeates out of the glass manufacturing vessel, depleting the metal/glass interface of hydrogen. Based on the chemical balance, for every mole of hydrogen that leaves the glass manufacturing vessel, ½ mole of oxygen is left behind at the glass/metal interface. Thus, as hydrogen leaves the glass manufacturing vessel, the oxygen level or partial pressure of oxygen at the metal/glass interface increases, which leads to the generation of blisters or gaseous inclusions in the molten glass. In addition, there are other reactions which involve the catalyzing or oxidation of other species within the molten glass such as halogens (Cl, F, Br) which can lead to the generation of gaseous inclusions within the molten glass and the resulting glass sheet. Further, there are oxidation reactions which can occur due to electrochemical reactions at the metal/glass interface. These electrochemical reactions can be associated with thermal cells, galvanic cells, high AC or DC current applications and grounding situations.

Today, there are several known methods that can be used to address these problematical oxidation reactions which cause the formation of gaseous inclusions in the molten glass and the resulting glass sheet. These known methods range from the use of glass coatings, atmospheric control around the external surfaces of the glass manufacturing vessels to DC protection. All of these methods have their uses, but come with significant costs and can be difficult to implement and maintain. For instance, there is a method which involves the use of a humidity controlled enclosure that surrounds one or more of the precious metal-containing glass manufacturing vessels and is used to control the partial pressure of hydrogen outside the vessel(s) so as to reduce the formation of gaseous inclusions in the glass sheets. Several different types of these humidity controlled enclosures are discussed in U.S. Pat. No. 5,785,726 and U.S. Pat. No. 7,628,039 (the contents of which are incorporated by reference herein). Although the use of a humidity controlled enclosure is effective, it is also expensive both in the capital cost to construct as well as the cost of operation. The principle expenses of operation are nitrogen, energy for air conditioning and steam production as well as the energy required for the fans that drive gas circulation. Thus, it would be desirable to provide an alternative method to prevent the formation of gaseous inclusions in glass sheets. This need and other needs are satisfied by the present invention.

SUMMARY

A glass manufacturing vessel, glass manufacturing systems, methods for producing a glass sheet or glass article, a method for fabricating the glass manufacturing vessel, a device configured to be partially inserted into molten glass, and to a system for manufacturing glass tubing are described in the independent claims of the present application. Advantageous embodiments of the glass manufacturing vessel, glass manufacturing systems, methods for producing a glass sheet or glass article, the method for fabricating the glass manufacturing vessel, the device configured to be partially inserted into molten glass, and to the system for manufacturing glass tubing are described in the dependent claims.

In one aspect, the present invention provides a glass manufacturing vessel configured to have molten glass flow therein. The glass manufacturing vessel comprises: (1) an external layer with a first side and a second side; (2) an intermediate layer; and (3) an internal layer with a first side and a second side. The intermediate layer is positioned between the second side of the external layer and the first side of the internal layer. In addition, the intermediate layer has a gas permeable structure that permits an atmosphere of gas to pass therein between the second side of the external layer and the first side of the internal layer.

In another aspect, the present invention provides a glass manufacturing system comprising: (a) a glass manufacturing vessel configured to have molten glass flow therein; and (2) a control system. The glass manufacturing vessel comprises: (1) an external layer with a first side and a second side; (2) an intermediate layer; and (3) an internal layer with a first side and a second side. The intermediate layer is positioned between the second side of the external layer and the first side of the internal layer. In addition, the intermediate layer has a gas permeable structure that permits an atmosphere of gas to pass therein between the second side of the external layer and the first side of the internal layer. The control system supplies the atmosphere of gas to the intermediate layer of the glass manufacturing vessel.

In yet another aspect, the present invention provides a method for producing a glass article. The method comprising the steps of: (a) flowing molten glass through a glass manufacturing vessel that comprises: (1) an external layer with a first side and a second side; (2) an intermediate layer; and (3) an internal layer with a first side and a second side, where the intermediate layer is positioned between the second side of the external layer and the first side of the internal layer, and where the intermediate layer has a gas permeable structure that permits an atmosphere of gas to pass therein between the second side of the external layer and the first side of the internal layer; and (b) supplying the atmosphere of gas to the intermediate layer of the glass manufacturing vessel.

In still yet another aspect, the present invention provides a glass manufacturing system comprising: (a) a melting vessel within which glass batch materials are melted to form molten glass; (b) a melting to fining tube which receives the molten glass from the melting vessel; (c) a fining vessel which receives the molten glass from the melting to fining tube and removes bubbles from the molten glass; (d) a finer to stir chamber tube which receives the molten glass from the fining vessel; (e) a stir chamber which receives the molten glass from the finer to stir chamber tube and mixes the molten glass; (f) a stir chamber to bowl connecting tube which receives the molten glass from the stir chamber; (g) a bowl which receives the molten glass from the stir chamber to bowl connecting tube; (h) a downcomer which receives the molten glass from the bowl; (i) a fusion draw machine which includes at least an inlet, and a forming vessel where: the inlet receives the molten glass from the downcomer; the forming apparatus receives the molten glass from the inlet and forms a glass sheet; and (j) at least one of the melting to fining tube, the fining vessel, the finer to stir chamber tube, the stir chamber, the stir chamber to bowl connecting tube, the bowl, the downcomer, and the inlet further comprises: (1) an external layer with a first side and a second side; (2) an intermediate layer; (3) and an internal layer with a first side and a second side, where the intermediate layer is positioned between the second side of the external layer and the first side of the internal layer, where the intermediate layer has a gas permeable structure that permits an atmosphere of gas to pass therein between the second side of the external layer and the first side of the internal layer; and (k) a control system that supplies the atmosphere of gas to the intermediate layer of the at least one of the melting to fining tube, the fining vessel, the finer to stir chamber tube, the stir chamber, the stir chamber to bowl connecting tube, the bowl, the downcomer, and the inlet.

In yet another aspect, the present invention provides a method for producing a glass sheet. The method comprising the steps of: (a) melting, within a melting vessel, glass batch materials to form molten glass; (b) removing, within a fining vessel, bubbles from the molten glass, where the melting vessel is connected to the fining vessel by a melting to fining tube; (c) mixing, within a stir chamber, the molten glass, where the stir chamber is connected to the fining vessel by a finer to stir chamber tube; (d) receiving, at a bowl, the molten glass, where the bowl is connected to the stir chamber by a stir chamber to bowl connecting tube; (e) receiving, at a downcomer, the molten glass, where the downcomer is connected to the bowl; (f) delivering, to an inlet, the molten glass, where the inlet is associated with the downcomer; (g) delivering, to a forming apparatus, the molten glass, where the forming apparatus is connected to the inlet; (h) forming, at the forming apparatus, a glass sheet from the molten glass; (i) at least one of the melting to fining tube, the fining vessel, the finer to stir chamber tube, the stir chamber, the stir chamber to bowl connecting tube, the bowl, the downcomer, and the inlet further comprises: (1) an external layer with a first side and a second side; (2) an intermediate layer; and (3) an internal layer with a first side and a second side, where the intermediate layer is positioned between the second side of the external layer and the first side of the internal layer, where the intermediate layer has a gas permeable structure that permits an atmosphere of gas to pass therein between the second side of the external layer and the first side of the internal layer; and (j) supplying, from a control system, the atmosphere of gas to the intermediate layer of the at least one of the melting to fining tube, the fining vessel, the finer to stir chamber tube, the stir chamber, the stir chamber to bowl connecting tube, the bowl, the downcomer, and the inlet.

In still yet another aspect, the present invention provides a method for fabricating a glass manufacturing vessel. The method comprising the step of laminating an external layer, an intermediate layer, and an internal layer, where the external layer has a first side and a second side and the internal layer has a first side and a second side, where the intermediate layer is positioned between the second side of the external layer and the first side of the internal layer, and where the intermediate layer has a gas permeable structure that permits an atmosphere to pass therein between the second side of the external layer and the first side of the internal layer.

In one aspect, the present invention provides a device configured to be partially inserted into molten glass. The device comprising: (a) a section having a first end and a second end, where the first end is not inserted into the molten glass and the second end is inserted into the molten glass; (b) a mesh wrapped around at least a portion of the section; and (c) a cladding wrapped around at least a portion of the mesh, wherein the mesh has a gas permeable structure that permits gas to pass therein between the section and the cladding, and the gas is permitted to exit from the mesh at the first end which is not inserted into the molten glass.

In another aspect, the present invention provides a system for manufacturing glass tubing. The system comprising: (a) a glass forehearth through which molten glass flows; (b) a device configured to be partially inserted into the molten glass within the glass forehearth, the device comprising: (i) a section having a first end and a second end, where the first end is not inserted into the molten glass and the second end is inserted into the molten glass; (ii) a bell attached to the second end and inserted into the molten glass; (iii) a mesh wrapped around at least a portion of the section; and (iv) a cladding wrapped around at least a portion of the mesh, wherein the mesh has a gas permeable structure that permits gas to pass therein between the section and the cladding, and the gas is permitted to exit from the mesh at the first end which is not inserted into the molten glass; and (c) the device further configured to have the molten glass flow there around the section which has the mesh and cladding wrapped thereon and the bell before the molten glass exits the glass forehearth to form the glass tubing.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIGS. 3A-3B respectively show a cross-sectional side view and a cross-sectional end view of an exemplary glass manufacturing vessel configured in accordance with an embodiment of the present invention;

FIGS. 5A-5B respectively show a cross-sectional side view and a cross-sectional end view of an exemplary glass manufacturing vessel configured in accordance with yet another embodiment of the present invention;

FIGS. 9A-9B are two diagrams used to explain one example of how the aforementioned composite metal structure can be applied to a device which is used in a glass forehearth to form glass tubing in accordance with yet another embodiment of the present invention.

DETAILED DESCRIPTION

Figure 1:
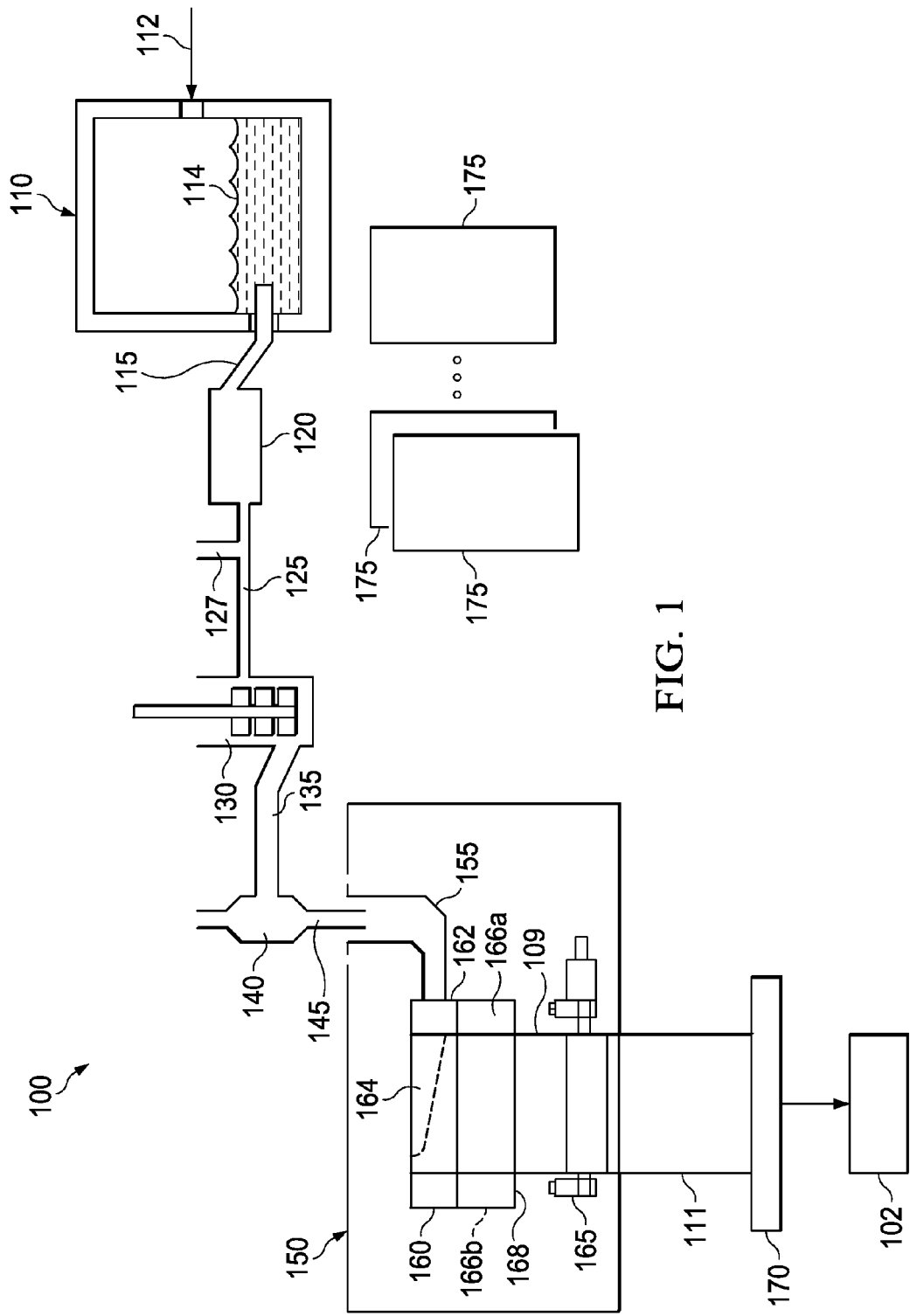
FIG. 1 is a schematic view of an exemplary glass manufacturing system which uses a fusion draw process to manufacture a glass sheet in accordance with an embodiment of the present invention.

Referring to FIG. 1, there is shown a schematic view of an exemplary glass manufacturing system 100 which uses a fusion draw process to manufacture a glass sheet 102 in accordance with an embodiment of the present invention. The glass manufacturing system 100 includes a melting vessel 110, a melting to fining tube 115, a fining vessel 120, a finer to stir chamber tube 125 (with a level probe stand pipe 127 extending therefrom), a stir chamber 130 (e.g., mixing vessel 130), a stir chamber to bowl connecting tube 135, a bowl 140 (e.g., delivery vessel 140), a downcomer 145, a fusion draw machine (FDM) 150 (which includes an inlet 155, a forming apparatus 160, and a pull roll assembly 165), and a traveling anvil machine (TAM) 170. Typically, the glass manufacturing vessels 115, 120, 125, 127, 130, 135, 140, 145 and 155 are made from platinum or platinum-containing metals such as platinum-rhodium, platinum-iridium and combinations thereof, but they may also comprise other refractory metals such as palladium, rhenium, ruthenium, and osmium, or alloys thereof. The forming apparatus 160 (e.g., isopipe 160) is typically made from a ceramic material or glass-ceramic refractory material.

The melting vessel 110 is where glass batch materials are introduced as shown by arrow 112 and melted to form molten glass 114. The fining vessel 120 (e.g., finer tube 120) is connected to the melting vessel 110 by the melting to fining tube 115. The fining vessel 120 has a high temperature processing area that receives the molten glass 114 (not shown at this point) from the melting vessel 110 and in which bubbles are removed from the molten glass 114. The fining vessel 120 is connected to the stir chamber 130 by the finer to stir chamber connecting tube 125. The stir chamber 130 is connected to the bowl 140 by the stir chamber to bowl connecting tube 135. The bowl 140 delivers the molten glass 114 (not shown) through the downcomer 145 into the FDM 150.

The FDM 150 includes the inlet 155, the forming vessel 160 (e.g., isopipe 160), and the pull roll assembly 165. The inlet 155 receives the molten glass 114 (not shown) from the downcomer 145 and from the inlet 155 the molten glass 114 (not shown) then flows to the forming vessel 160. The forming vessel 160 includes an opening 162 that receives the molten glass 114 (not shown) which flows into a trough 164 and then overflows and runs down two opposing sides 166a and 166b before fusing together at a root 168 to form a glass sheet 109. The pull roll assembly 165 receives the glass sheet 109 and outputs a drawn glass sheet 111. The TAM 170 receives the drawn glass sheet 111 and separates the drawn glass sheet 111 into separate glass sheets 102.

In accordance with an embodiment of the present invention, one or more of the glass manufacturing vessels 115, 120, 125, 127, 130, 135, 140, 145 and 155 have a configuration which enables an atmosphere of gas to pass therein which helps suppress hydrogen permeation blistering within the molten glass 114 or otherwise benefit the glass production. Furthermore, the glass manufacturing system 100 includes one or more control systems 175 which supply the atmosphere to the one or more specially configured glass manufacturing vessels 115, 120, 125, 127, 130, 135, 140, 145 and 155. For instance, one control system 175 can be used to supply the atmosphere of gas to all of the specially configured glass manufacturing vessels 115, 120, 125, 127, 130, 135, 140, 145 and 155. Or, one control system 175 can be used to supply the atmosphere to one or any combination of the specially configured glass manufacturing vessels 115, 120, 125, 127, 130, 135, 140, 145 and 155. A detailed description about one of the specially configured glass manufacturing vessels 115, 120, 125, 127, 130, 135, 140, 145 and 155 namely the finer to stir chamber tube 125 (with the level probe stand pipe 127 extending therefrom) is discussed next with respect to FIG. 2.

Figure 2:
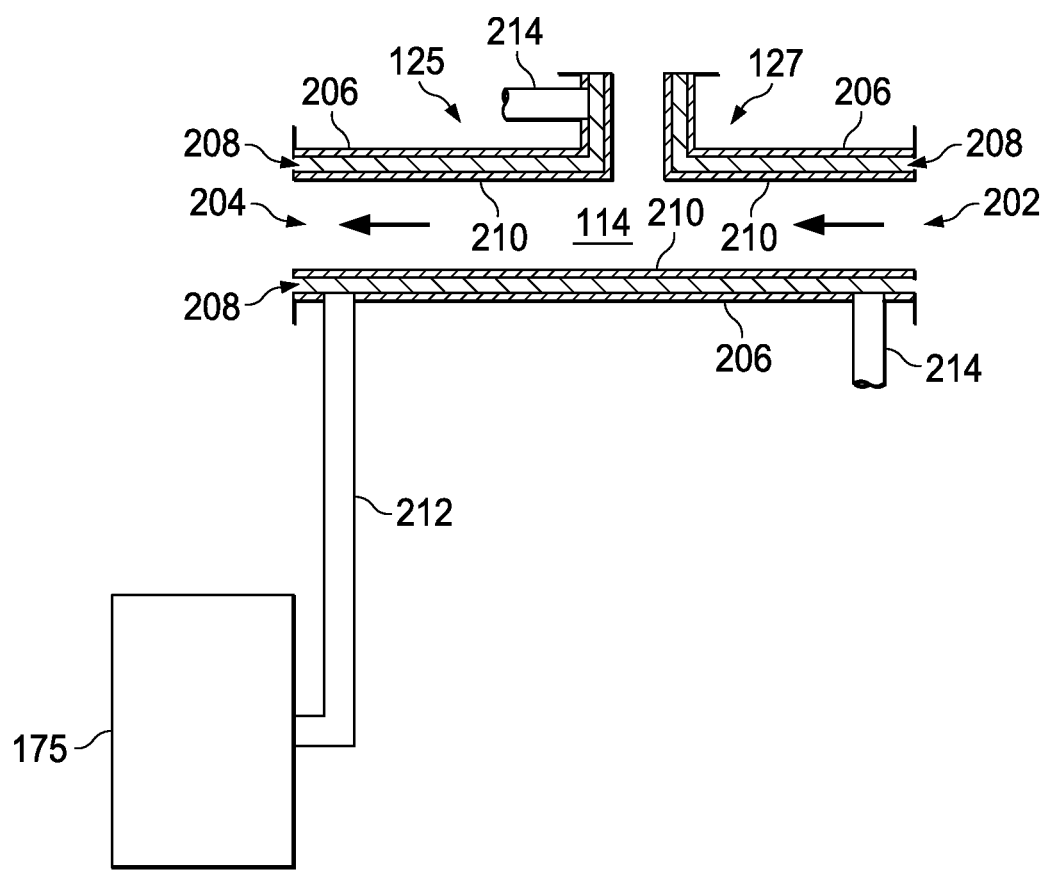
FIG. 2 is a cross-sectional side view of a finer to stir chamber tube (with a level probe stand pipe extending therefrom) of the glass manufacturing system shown in FIG. 1 configured in accordance with an embodiment of the present invention.

Referring to FIG. 2, there is shown a cross-sectional view of an exemplary finer to stir chamber tube 125 (with the level probe stand pipe 127 extending therefrom) configured in accordance with an embodiment of the present invention. As shown, the finer to stir chamber tube 125 has an input 202 from which molten glass 114 is received from the fining vessel 120 (not shown) and an output 204 from which the molten glass 144 is provided to the stir chamber 130 (not shown). The finer to stir chamber tube 125 and the level probe stand pipe 127 include an external layer 206 (e.g., precious metal sheet 206), an intermediate layer 208 (e.g., mesh screen 208, beads 208, corrugated or dimpled metal sheet 208) and an internal layer 210 (e.g., precious metal sheet 210). The intermediate layer 208 is positioned or otherwise located between the external layer 206 and the internal layer 210. The intermediate layer 208 has a gas permeable structure that permits an atmosphere of gas to pass therein between the external layer 206 and the internal layer 210. The control system 175 creates and provides the atmosphere of gas through an input port 212 within the external layer 206 to the intermediate layer 208. The atmosphere of gas maintains a positive pressure within open spaces of the intermediate layer 208 and suppresses blister formation within the molten glass 114 or otherwise benefits the glass production. The gas may exit the intermediate layer 208 from one or more outlet ports 214 (two shown) formed within the external layer 206. For example, the gas output from the intermediate layer 208 may be recycled by the control system 175, or some other recovery system, or released into the manufacturing facility. Alternatively, if the finer to stir chamber tube 125 and the level probe stand pipe 127 are not totally gas tight then only the input port 212 may be used and the gas can leak out at some other place or places in the finer to stir chamber tube 125 and the level probe stand pipe 127. It should be appreciated that the finer to stir chamber tube 125 and the level probe stand pipe 127 or any glass manufacturing vessel can have any type of shape and this particular precious metal structure 206, 208 and 210 or a wide variety of different precious metal structures 206, 208 and 210 in accordance with different embodiments of the present invention as will be discussed next with respect to FIGS. 3-5.

Referring to FIGS. 3A-3B, there are respectively shown a cross-sectional side view and a cross-sectional end view of an exemplary glass manufacturing vessel 300 configured in accordance with an embodiment of the present invention. The glass manufacturing vessel 300 is designed to have molten glass 114 flow therein. The glass manufacturing vessel 300 is configured to have an external layer 206 (e.g., precious metal sheet 206), an intermediate layer 208 (e.g., mesh screen 208, beads 208, corrugated or dimpled metal sheet 208) and an internal layer 210 (e.g., precious metal sheet 210). The external layer 206 includes a first side 302 and a second side 304 and the internal layer 210 includes a first side 306 and a second side 308. The intermediate layer 208 is positioned or otherwise formed between the second side 304 of external layer 206 and the first side 306 of the internal layer 210. The intermediate layer 208 has a gas permeable structure that permits an atmosphere of gas to pass therein between the external layer 206 and the internal layer 210. In this example, the internal layer's second side 308 contacts the molten glass 114. The control system 175 (not shown) creates and provides the atmosphere of gas through an input port 212 within the external layer 206 to the intermediate layer 208. The atmosphere of gas maintains a positive pressure within open spaces of the intermediate layer 208 and suppresses blister formation within the molten glass 114 or otherwise benefits the glass production. The gas may exit the intermediate layer 208 from an outlet port 214 (if used) formed within the external layer 206. The gas output from the intermediate layer 208 may be recycled by the control system 175 (not shown), some other recovery system, or released into the manufacturing facility. A discussion is provided next with respect to FIGS. 4 and 5 to explain how an existing glass manufacturing vessel can be retrofitted to be configured in accordance with an embodiment of the present invention.

Figure 4B:
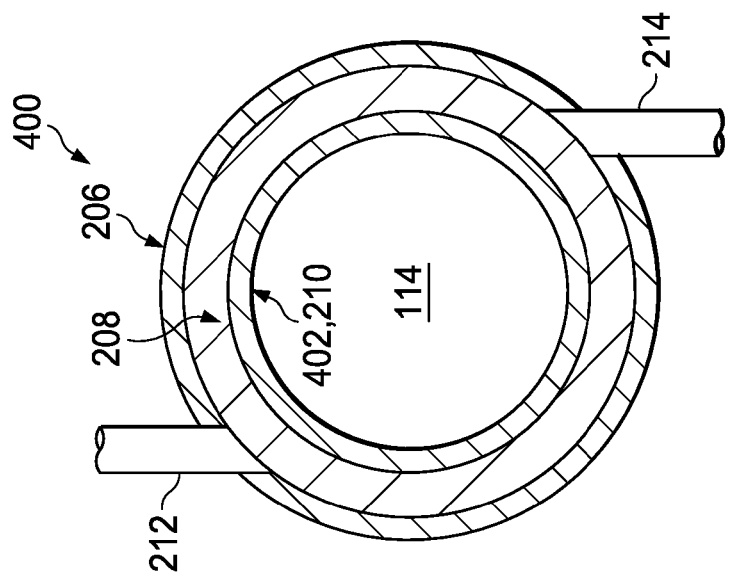
FIGS. 4A-4B respectively show a cross-sectional side view and a cross-sectional end view of an exemplary glass manufacturing vessel configured in accordance with another embodiment of the present invention.
Figure 4A:
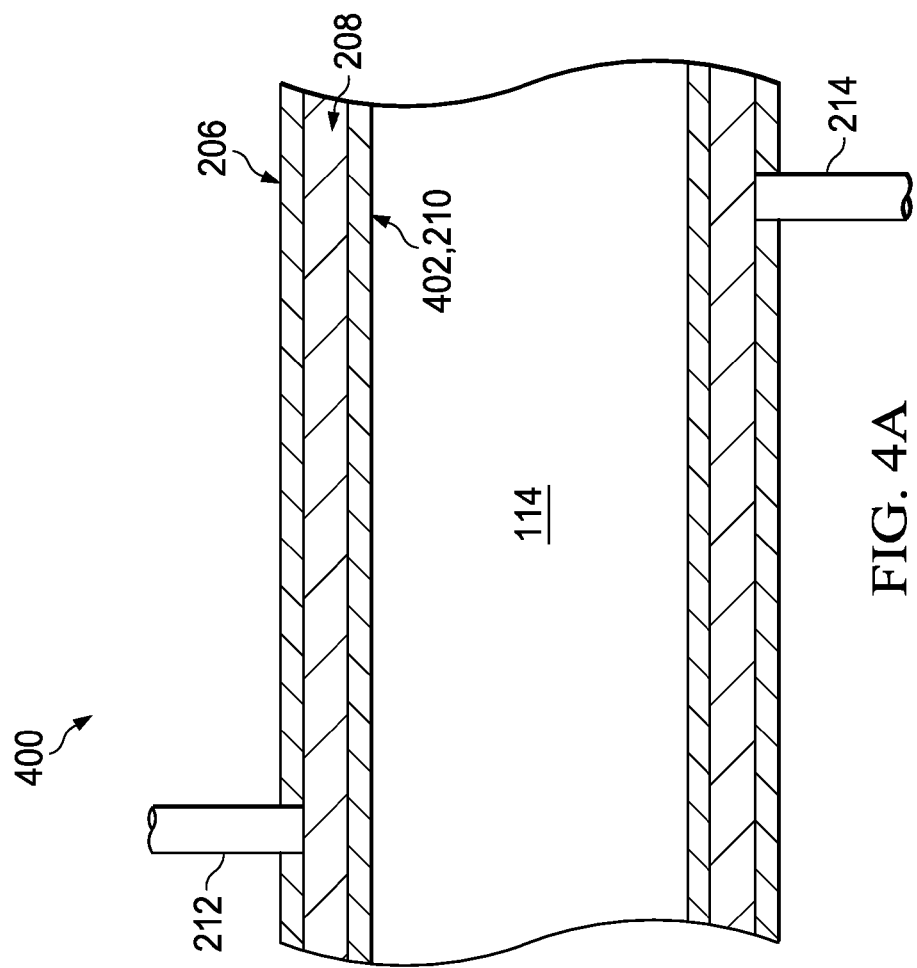

Referring to FIGS. 4A-4B, there are respectively shown a cross-sectional side view and a cross-sectional end view of an exemplary glass manufacturing vessel 400 configured in accordance with an embodiment of the present invention. The glass manufacturing vessel 400 is formed by taking an existing glass manufacturing vessel 402 (existing structure 402) and applying the intermediate layer 208 (e.g., mesh screen 208, corrugated or dimpled metal sheet 208) over the existing glass manufacturing vessel 402 (existing structure 402) and then applying the external layer 206 (e.g., precious metal sheet 206) over the intermediate layer 208. In this case, the aforementioned internal layer 210 is the existing glass manufacturing vessel 402 (existing structure 402). The intermediate layer 208 has a gas permeable structure that permits an atmosphere of gas to pass therein between the external layer 206 and the existing glass manufacturing vessel 402 (existing structure 402). The control system 175 (not shown) creates and provides the atmosphere of gas through the input port 212 within the external layer 206 to the intermediate layer 208. The atmosphere of gas maintains a positive pressure within open spaces of the intermediate layer 208 and suppresses blister formation within the molten glass 114 or otherwise benefits the glass production. The gas may exit the intermediate layer 208 from the outlet port 214 (if used) formed within the external layer 206. The gas output from the intermediate layer 208 may be recycled by the control system 175 (not shown), some other recovery system, or released into the manufacturing facility if the system if not fully gas tight.

Referring to FIGS. 5A-5B, there are respectively shown a cross-sectional side view and a cross-sectional end view of an exemplary glass manufacturing vessel 500 configured in accordance with an embodiment of the present invention. The glass manufacturing vessel 500 is formed by taking an existing glass manufacturing vessel 502 (existing structure 502) and applying the external layer 206 over the existing glass manufacturing vessel 502 (existing structure 502). In this case, the external layer 206 has a corrugated or dimpled structure such that the intermediate layer 208 is formed by the open spaces that are created when the external layer 206 is positioned next to the existing glass manufacturing vessel 502 (existing structure 502). In the illustrated example, the corrugated external layer 206 is positioned to be just off the existing structure 502 so the gas atmosphere can pass through all of openings created by the corrugated external layer 206. Alternatively, the corrugated external layer 206 can contact the existing structure 502 but in this case the input port 212 would be around the entire perimeter of the corrugated external layer 206 so the gas atmosphere can pass the openings created by the corrugated external layer 206. In another example, the dimpled external layer 206 can have dimples that contact the internal layer 210 at selected points and thus create the gas permeable layer 208 so the gas atmosphere can pass in between the dimpled external layer 206 and the internal layer 210. If desired, the glass manufacturing vessel 502 does not need to be made from existing glass manufacturing vessel 502 but could be made by taking a new structure (e.g., downcomer, bowl) and then applying the external layer 206 which has the corrugated or dimpled structure over the new structure. In any case, the aforementioned internal layer 210 is the existing glass manufacturing vessel 502 (existing structure 502) or the new structure. Plus, the formed intermediate layer 208 permits an atmosphere of gas to pass therein between the external layer 206 and the existing glass manufacturing vessel 502 (existing structure 502) or the new structure. The control system 175 (not shown) creates and provides the atmosphere of gas through the input port 212 within the external layer 206 to the intermediate layer 208 (e.g., open spaces). The atmosphere of gas maintains a positive pressure within open spaces of the intermediate layer 208 and suppresses blister formation within the molten glass 114 or otherwise benefits the glass production. The gas may exit the intermediate layer 208 from the outlet port 214 (if used) formed within the external layer 206. The gas output from the intermediate layer 208 may be recycled by the control system 175 (not shown), some other recovery system, or released into the manufacturing facility.

In view of the foregoing, one will appreciate that in one of its simplest forms the present invention relates to the fabrication and use of a glass manufacturing vessel 300, 400 and 500 (which can have any physical shape) that has an intermediate layer 208 (e.g., integral gas permeable membrane 208) located or formed between two layers of precious metal 206 and 210. The intermediate layer 208 (e.g., integral gas permeable membrane 208) would have an atmosphere of gas passed through it to suppress hydrogen permeation blistering in the molten glass 114 or to provide an atmosphere of benefit to the glass production. In addition, one will appreciate that the glass manufacturing vessel 300, 400 and 500 with this composite metal 206, 208 and 210 could be used for the melting, delivery or forming of glass. The glass manufacturing vessel 300, 400 and 500 with the intermediate layer 208 (e.g., integral gas permeable membrane 208) could be fabricated in many ways several of which are discussed below.

Figure 6:
FIGS. 6-8 are photographs used to help describe a process that was used in a lab to form and use an exemplary composite metal structure in accordance with an embodiment of the present invention.
Figure 7:
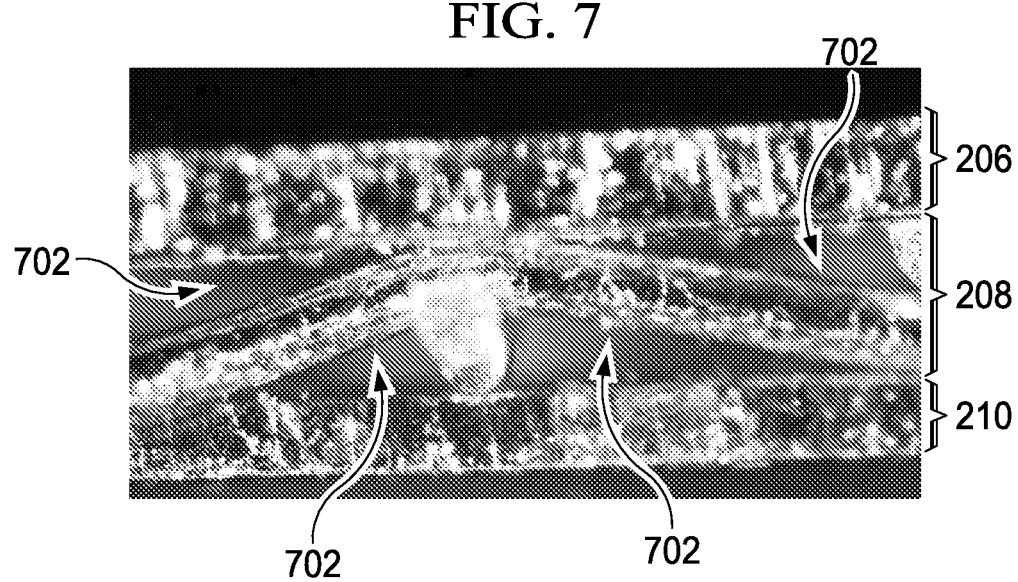

One exemplary method of fabricating the glass manufacturing vessel 300 (for example) is the lamination of the intermediate layer 208 (e.g., woven precious metal mesh 208) between the external and internal layers 206 and 210 (e.g., two layers of platinum cladding 206 and 208). This can be done by roll bonding, welding or by the fabrication of concentric cylinders that are nested together. FIGS. 6 and 7 are photographs of an exemplary composite metal structure 206, 208 and 210 that was fabricated in the lab by roll bonding. FIG. 6 is a cross section of the precious metal mesh 208 laminated between two sheets of 0.010" thick precious metal 206 and 210 (see also FIGS. 8A-8F). FIG. 7 is a close-up of the cross section of the precious metal mesh 208 laminated between the two precious metal sheets 206 and 210 where the atmosphere can pass in open spaces 702 between the two precious metal sheets 206 and 210.

The control system 175 can provide the protective atmosphere which could be introduced into the intermediate layer 208 (e.g., woven precious metal mesh 208) through the ends or by one or more inlet ports 212 drilled into the external (non-glass contact) skin of the structure. Typically, the control system 175 would only need to supply a volume of gas which is enough to maintain a positive pressure of gas inside the intermediate layer 208. In one example, the control system 175 should be able to humidify whatever gas mixture is introduced into the intermediate layer 208. In addition, the control system 175 should be able to mix various gases such as nitrogen and water or combustible gases and supply the atmosphere using mass flow controllers. Furthermore, the control system 175 should be able to accurately control the partial pressures of the various gases to help suppress hydrogen permeation blistering in the molten glass 114 or otherwise benefit glass production.

Referring to FIGS. 8A-8F, there are photographs used to help describe a process that was used in a lab to form and use the exemplary composite metal structure 206, 208 and 210 shown in FIGS. 6-7. The first step in the fabrication of the gas permeable precious metal structure 206, 208 and 210 is to assembly the starting materials which in this case include a 40 mesh Pt-10Rh screen 208 and two 0.010" thick Pt sheets 206 and 210 (see FIGS. 8A-8C). The 40 mesh Pt-10Rh screen 208 used in this demonstration was woven in structure and constructed of 0.008" diameter wires. However, it should be appreciated that a broad range of wire diameters, mesh sizes, cladding thicknesses and metal compositions could be used for the gas permeable precious metal structure 206, 208 and 210. In any case, the sandwich of Pt metal sheets 206 and 210 with the 40 mesh Pt-10Rh screen 208 positioned in between the two Pt metal sheets 206 and 210 was spot welded together in the center for ease of handling and to keep the structure together during the assembly process. Then, the sandwich of Pt metal sheets 206 and 210 with the 40 mesh Pt-10Rh screen 208 was heated to 1200° C. and transferred hot to the rolling mill 802. Thereafter, the sandwich of Pt metal sheets 206 and 210 with the 40 mesh Pt-10Rh screen 208 was rolled together with a roll gap setting to give a 10% reduction in thickness (see FIG. 8D). This roll cladding procedure was repeated one more time with an additional 10% reduction in thickness, after reheating the sandwich of Pt metal sheets 206 and 210 with the 40 mesh Pt-10Rh screen 208 to 1200° C. (see FIG. 8E). The cross sections of the structure produced in this experiment are shown in FIGS. 6-7 where it can readily be seen that the woven structure of the 40 mesh Pt-10Rh screen 208 provides areas of continuous porosity 702 where the protective atmosphere would flow between the two Pt metal sheets 206 and 210.

Figure 8A:
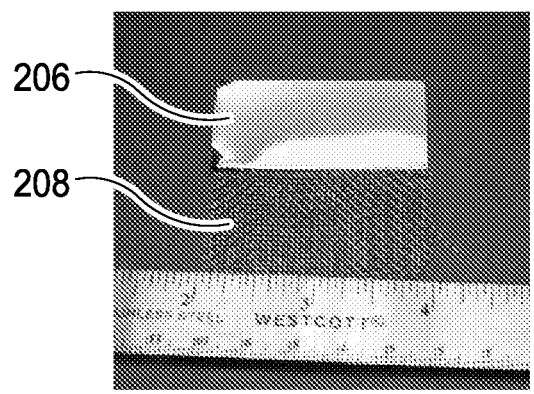
Figure 8B:
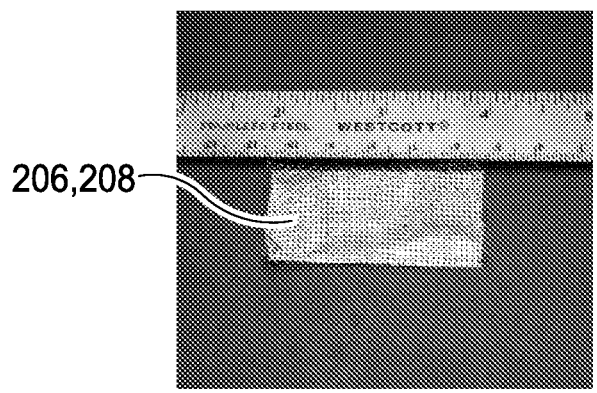
Figure 8C:
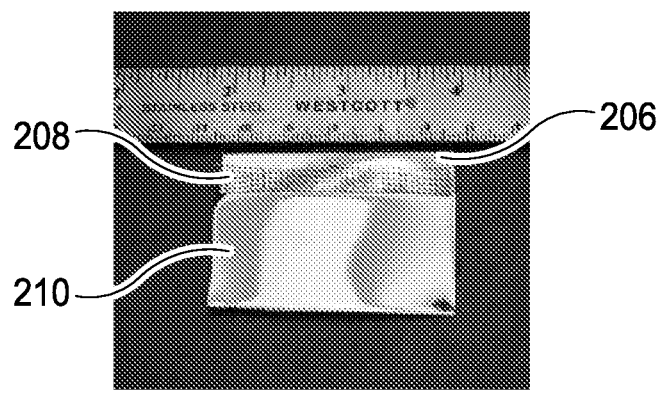
Figure 8D:
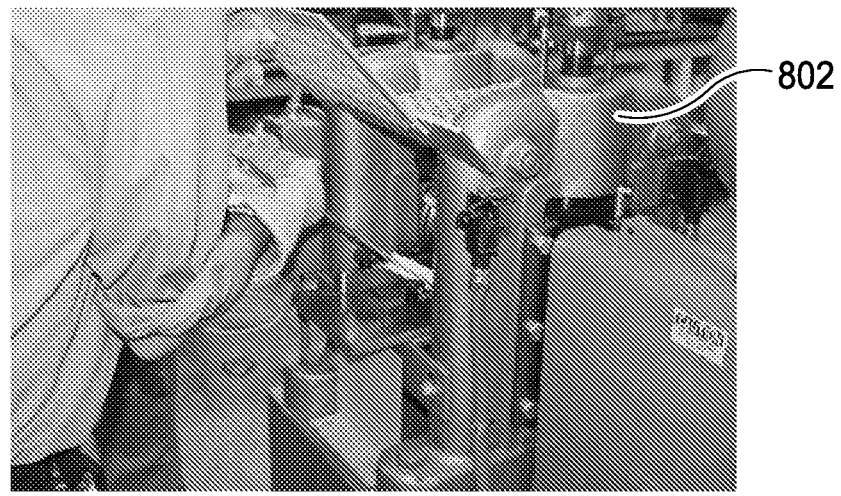
Figure 8E:
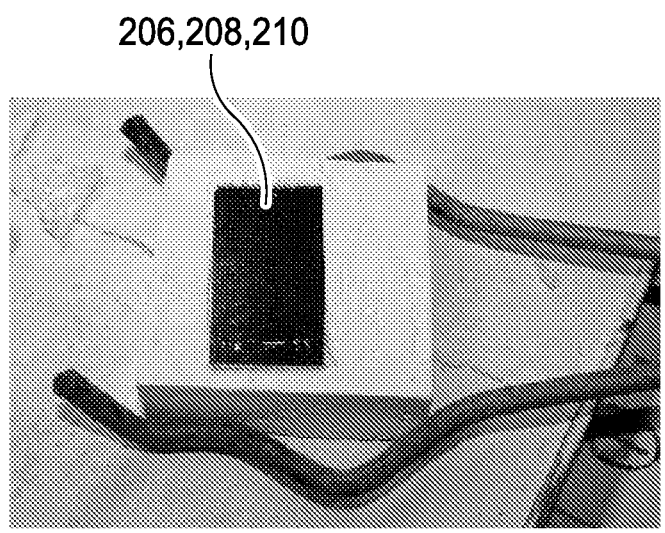
Figure 8F:
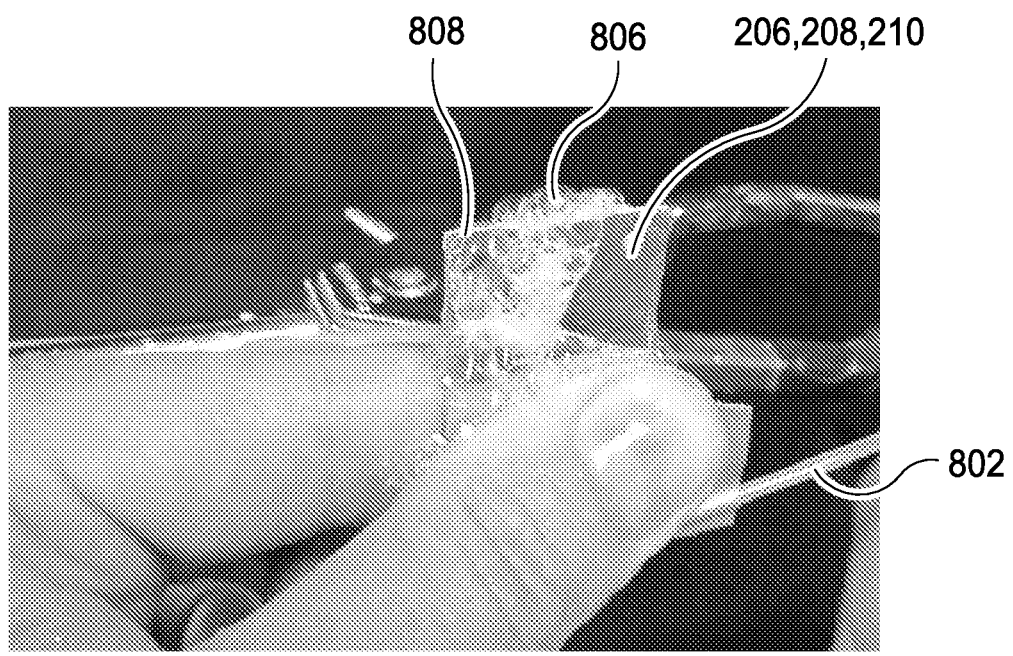

To verify that the assembled sandwich of Pt metal sheets 206 and 210 with the 40 mesh Pt-10Rh screen 208 did indeed include a gas permeable membrane 208 that was an integral part of the cladding a flow test was run. For this test, the two longer sides of the laminated structure 206, 208 and 210 were welded together to provide a gas tight seal. This left the laminated structure 206, 208 and 208 with openings at both shorter ends. As shown in FIG. 8F, a plastic tube 802 was taped to one short end (located behind thumb) of the laminated structure 206, 208 and 210 as an inlet for gas. Then, liquid soap 806 was applied to the opposing short end 808 of the laminated structure 206, 208 and 210 as a method to detect gas flow through the laminated structure 206, 208 and 210. A slight flow of gas was applied through the plastic tub 802. As can be seen in FIG. 8F, the gas flow resulted in the liquid soap 806 generating bubbles at the other end 808 of the laminated structure 206, 208 and 210.

The process described above is exemplary and by no means the only method for fabricating and utilizing the composite metal structure 206, 208 and 210. As an alternative, the metal external layer 206, intermediate layer 208 (e.g., mesh) and the metal internal layer 210 could be fabricated together by standard sheet metal technology of forming and welding. Additionally, the intermediate layer 208 could be beads of precious metal or an inert refractory material that provide some structural support and separation for gas flow between the external layer 206 (e.g., precious metal sheet 206) and the internal layer 210 (e.g., precious metal sheet 210). In addition, the intermediate layer 208 with the porous structure could be formed by joining a corrugated or dimpled external layer 206 to a corrugated or dimpled internal layer 206 to make a laminate structure. Alternatively, the intermediate layer 208 with the porous structure could be formed by joining a corrugated or dimpled external layer 206 to flat internal layer 210 or vice versa joining a flat external layer 206 to a corrugated or dimpled internal layer 210 to make a laminate structure. Furthermore, it is possible to use dissimilar materials for the external layer 206 and the internal layer 210 cladding of the laminate structure. For instance, a material such as Iridium that has favorable properties for glass contact yet is prone to oxidation could be used as the internal layer 210. The iridium would provide erosion and contamination resistance, yet be protected from oxidation on its external surface by flowing a reducing environment within the intermediate layer 208 between the external layer 206 and the internal layer 210. The external layer 206 could be made of standard precious metal for resistance to oxidation. Moreover, the mesh that is used as the intermediate layer 208 could be made of some material with superior strength to the standard Pt-20Rh alloy. The mesh would not necessarily have to be compatible with the molten glass 114, since it would not come in contact with the molten glass 114.

Finally, the composite metal structure 206, 208 and 210 and in particular the intermediate layer 208 (e.g., gas permeable precious metal structure 208) should be designed from an atmosphere flow standpoint such that the intermediate layer 208 has open spaces (e.g., pore sizes) that are large as possible to minimize the pressure drop and flow restriction for the atmosphere inside the gas permeable precious metal structure 206, 208 and 210. From a strength standpoint, the composite metal structure 206, 208 and 210 should be designed such that the intermediate layer 208 has open spaces (e.g., pore sizes) which are minimized to support the external layer 206 and the internal layer 208 on either side of the intermediate layer 208 and prevent the external layer 206 and the internal layer 210 from sagging or creeping into the open spaces (e.g., pores) in the intermediate layer 208. For instance, the bigger the open spaces (e.g., pore sizes), the more likely the internal layer 210 will sag into the void area from the hydrostatic pressure of the glass head inside the glass manufacturing vessel. Basically, all of these factors should at least be taken into account when designing the composite metal structure 206, 208 and 210 for use in the glass manufacturing system.

From the foregoing, one skilled in the art will appreciate that present invention relates to a method and procedure to fabricate and use an intermediate layer 208 (e.g., integral gas permeable structure 208) between the external layer 206 and internal layer 210 which can be the platinum cladding of a glass manufacturing vessel for manufacturing high quality glass. The integral gas permeable structure 208 is internal to the precious metal cladding 206 and 210 and serves as a distribution system for the protective atmosphere for hydrogen permeation blistering suppression or otherwise benefiting the glass production. In other words, the "capsule" intermediate layer 208 is actually part of the structure of the platinum wall of the melt, delivery and forming glass manufacturing vessels. As discussed above, there are many ways to make the composite metal structure 206, 208 and 210 with the integral gas permeable structure 208. One exemplary process is to laminate a precious metal sheet 206 (e.g., platinum sheet 206), a woven precious metal mesh screen 208 and another precious metal sheet 210 (e.g., platinum sheet 210). One layer of the precious metal sheet 210 would be the glass contact or inside surface of the glass manufacturing vessel 300, 400 and 500. The mesh screen 208 would serve to create a gas permeable gap between the two precious metal sheets 206 and 210. The open spaces of the mesh screen 208 is where the atmosphere would flow to surround the precious metal sheet 210 that is in contact with the production molten glass 114. The external layer 206 of platinum would serve as the external vessel to contain the protective atmosphere and prevent its leakage or dilution. The present invention would eliminate the need for an external capsule and the large Environmental Control Unit (ECU) used for the generation and control of the protective atmosphere. There are many advantages that the present invention has over the current technology. For instance, some of the advantages that the present invention has over the existing capsule and enclosure technology are as follows:

Capability Advantage

The laminated or internal porous structure of the present invention is an integral part of the platinum cladding of the melt, delivery or forming system and as a result there is flexibility in where and how it can be installed.

The laminated or internal porous structure of the present invention can be used as a replacement for any area of current cladding in a glass manufacturing system. For instance, there may be an area of the melt, delivery or forming system where the current protective atmosphere adversely affects the life of performance of the parts of the system and the laminated or internal platinum structure of the present invention can be used in this area of the melt, delivery or forming system.

The laminated or internal porous structure of the present invention can be used to improve sealing in general and to improve the ability to have better atmosphere control because leakage into and out of the protective atmosphere can be controlled.

Cost Advantage

From a cost standpoint, the present invention would greatly reduce the capital cost for hydrogen permeation protection by eliminating the need for a humidity controlled enclosure on the aforementioned glass manufacturing system 100. It would also substantially reduce the cost of the ECU for supplying the protective atmosphere, since the present invention would require only a low amount of protective atmosphere flow.

There are also operational savings in both nitrogen consumption and energy usage. The present invention could be a gas tight structure and thus require much less make-up nitrogen in order to maintain a positive pressure of protective gas. Additionally, the amount of protective atmosphere needed to circulate in the integral system would be a small percentage when compared to the existing humidity controlled enclosure thus requiring less energy for steam generation and the circulation of the protective atmosphere.

The present invention could also allow a cost reduction in the amount of precious metal (e.g., platinum) required for cladding on the glass manufacturing vessels. For example, the one concept of a laminated structure with precious metal mesh 208 between two layers of precious metal skin 206 and 210 could give equivalent structural stiffness and strength with less precious metal due to the low amount of precious metal per unit volume for a mesh/screen structure versus solid precious metal.

Furthermore, it should be appreciated that the glass manufacturing vessels 300, 400 or 500 can be used in any type of glass manufacturing system that uses precious metal or any glass melted or flowing in precious metal. Plus, the glass manufacturing vessels 300, 400 or 500 can be used to manufacture, for example, optical glasses, borosilicate glasses, alumino-borosilicate glasses, and soda-lime-silicate glass. Furthermore, the glass manufacturing vessels 300, 400 or 500 can be used to produce any type of glass article such as, for example, lenses, plate glass, table ware, containers, glass tubing, glass parts for optical applications and not just a glass sheet.

Figure 9A:
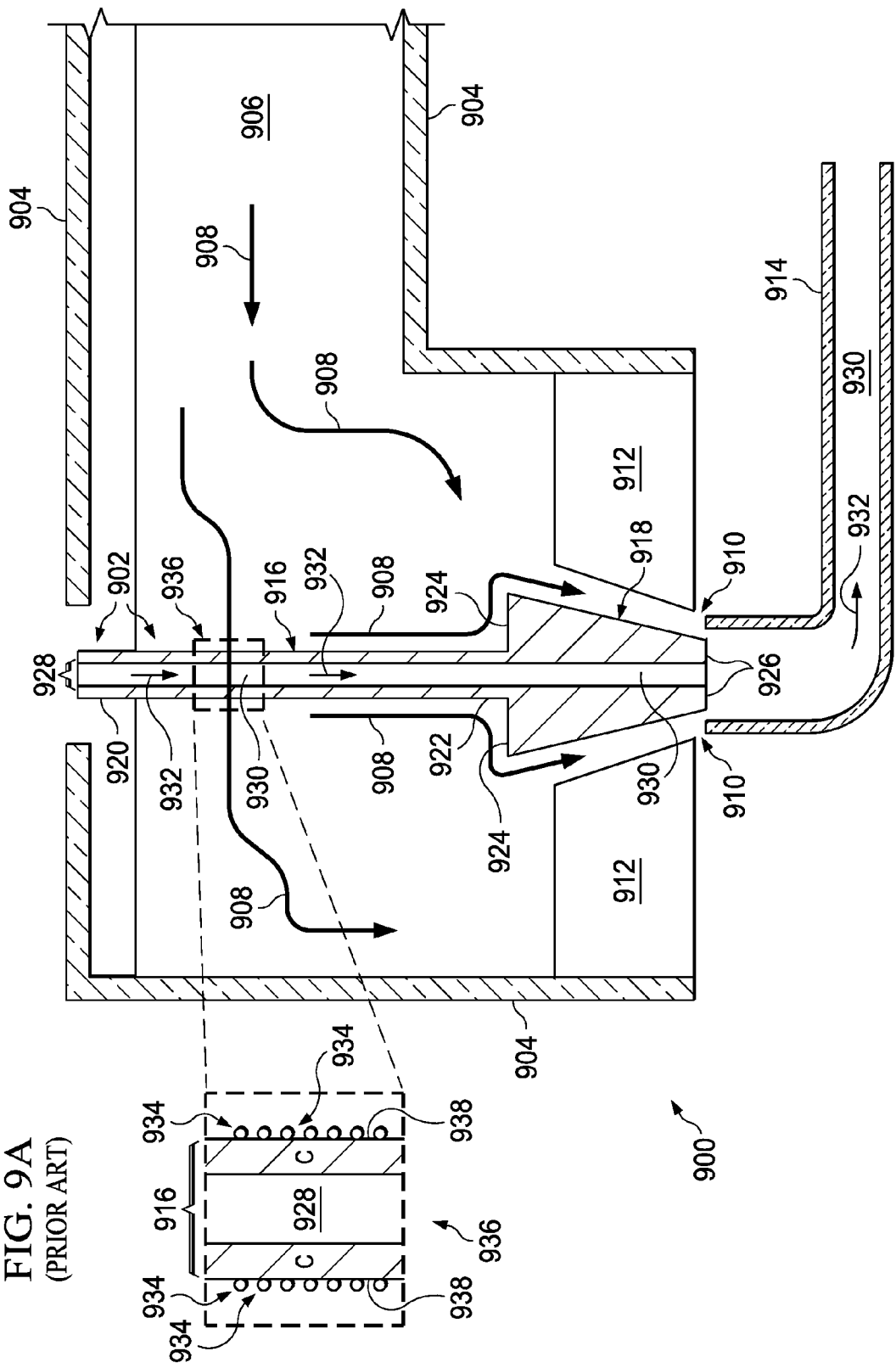

Moreover, it should be appreciated that the inventive concept of the aforementioned integral capsule can be used to address problems in other glass manufacturing applications such as, for example, a glass tubing manufacturing application. Referring to FIG. 9A (PRIOR ART), there is illustrated a portion of a traditional glass tubing manufacturing system 900 where a device 902 is located in a glass forehearth 904 and molten glass 906 which is received from a tank (not shown) and flows in the direction of arrows 908 around the device 902 and out of an opening 910 formed by a ring 912 at the bottom of the glass forehearth 904 to manufacture glass tubing 914. The device 902 includes a section 916 and a bell 918 which are attached to one another. The section 916 has one end 920 a portion of which is extending above the molten glass 906 and a second end 922 which is located in the molten glass 906 and attached to the bell 918. The bell 918 is positioned within the opening 910 formed by the ring 912 however the bell 918 does not contact the ring 912. The bell 918 has a circular-shaped top portion 924 which is attached to the section's second end 922 and a circular-shaped bottom portion 926 from which the glass tubing 914 is drawn from. The bell's circular-shaped top portion 924 has a larger diameter than the section's second end 922. In addition, the bell's diameter is continually reduced as one moves from the circular-shaped top portion 924 to the circular-shaped bottom portion 926. Alternatively, the bell 918 can be shaped where the lower portion 926 has a larger diameter than the top portion 924 and in this case the top portion 924 would be located below the ring 912. In any case, the section 916 and bell 918 both have an opening 928 formed therein through which a gas 930 (e.g., air 930) travels in a direction indicated by arrows 932. The flowing gas 930 functions to keep the glass tubing 914 that is formed from collapsing. The device 902 is held somewhere external to the glass forehearth 904 by a bell positioner (not shown) which can raise, lower and move the device 902 in any direction to properly position the device 902.

The traditional glass tubing manufacturing system 900 suffers from a problem where the metal (e.g., platinum, stainless steel, high temperature alloys (e.g., inconnel), precious metal) used to make the bell's section 916 can be contaminated with carbon (C) (and possibly other elements) which forms $CO_2$ bubbles 934 when in contact with the molten glass 906 (see expanded view 936). The $CO_2$ bubbles 934 end-up as blister defects in the glass tubing 914. The mechanism by which this blister formation happens is the oxidation of the carbon (C) from the contaminated section 916. As the carbon (C) is oxidized at the metal-glass interface 938, more carbon (C) from the bulk metal diffuses to the surface metal. Thus, the $CO_2$ bubbles 934 form at the metal-glass interface 938 and eventually the $CO_2$ bubbles 934 are incorporated in the molten glass 906 as defects. This reaction would continue on until the carbon (C) in the contaminated section 916 is exhausted which can take a long time because of the kinetics of the metal-glass interface 938 reactions. During this time defective glass tubing 914 is being made. A detailed discussion about how this problem can be solved is provided next with respect to FIG. 9B.

Referring to FIG. 9B, there is illustrated a portion of a glass tubing manufacturing system 900' which is the same as the aforementioned glass tubing manufacturing system 900 except that it incorporates an improved device 902' in accordance with an embodiment of the present invention. The improved device 902' is located in the glass forehearth 904' and molten glass 906' which is received from a tank (not shown) flows in the direction of arrows 908' around the improved bell device 902' and out of the opening 910' formed by the ring 912' at the bottom of the glass forehearth 904' to manufacture glass tubing 914'. The improved device 902' is the same as the aforementioned bell device 902 in that it includes the section 916' (with the first end 920', the second end 922', and hole 928') and the bell 918' (with the circular-shaped top portion 924', the circular-shaped bottom portion 926', and hole 928') through both of which a gas 930' (e.g., air) flows in direction of arrows 932' to help prevent the glass tubing 914' which is being formed from collapsing. However, the improved device 902' has at least a portion of the contaminated section 916' wrapped with a mesh 917' (e.g., platinum mesh 917', gas permeable structure 917') and then a non-contaminated cladding 919' (e.g., platinum-rhodium cladding 919', stainless steel cladding 919', high temperature alloy cladding 919' (e.g., inconnel cladding 919')) is wrapped around the mesh 917'. The section's mesh 917' and cladding 919' would extend above the molten glass 906' and be open to an ambient atmosphere 938' or a combustion atmosphere 940' in the forehearth 904'. This atmosphere 938' or 940' would contain some level of oxygen. By diffusion and convection, this atmosphere 938' or 940' would fill the void area that the mesh 917' makes between the contaminated section 916' and the non-contaminated cladding 919'. The contact of the ambient or combustion atmosphere 938' or 940' with the exposed surface of the section 916' would cause the oxidation of the carbon (C) in the section 916' (see expanded view 942'). This oxidation reaction would form $CO_2$ gas 944'. The difference between the problematic $CO_2$ bubbles 934 and this $CO_2$ gas 944' is that the $CO_2$ gas 944' would form in the void area of the mesh 917' and harmlessly diffuse out of this area into the ambient or combustion atmosphere 938' or 940' rather than into the molten glass 906'. The $CO_2$ gas 944' formed would not cause blisters in the molten glass 906'. Plus, the formed $CO_2$ gas 944' would not contaminate the cladding 919' because for carbon (C) to adversely affect the metal cladding 919' (precious metal cladding 919') it must be in the reduced or elemental form. If desired, the improved device 902' may contain an optional input port 950' and an optional output port 952' both of which would extend through the cladding 919'. The optional input port 950' would be connected to non-contaminated tubing 954' through which a gas (e.g., air) would flow to assist in the removal of the $CO_2$ gas 1044 from the mesh 917'. The optional output port 952' would be connected to non-contaminated tubing 956' through which the gas (e.g., air) and $CO_2$ gas 944' would flow from the mesh 917'. It should be appreciated that any device which contains a contaminate such as carbon and contacts molten glass 906 can be wrapped in the mesh 917' and cladding 919' like the improved device 902' to help prevent or at least reduce the formation of $CO_2$ bubbles 934 or other problematical gas bubbles in the molten glass 906'. An example of such a device is discussed below with respect to FIG. 10.

Figure 10:
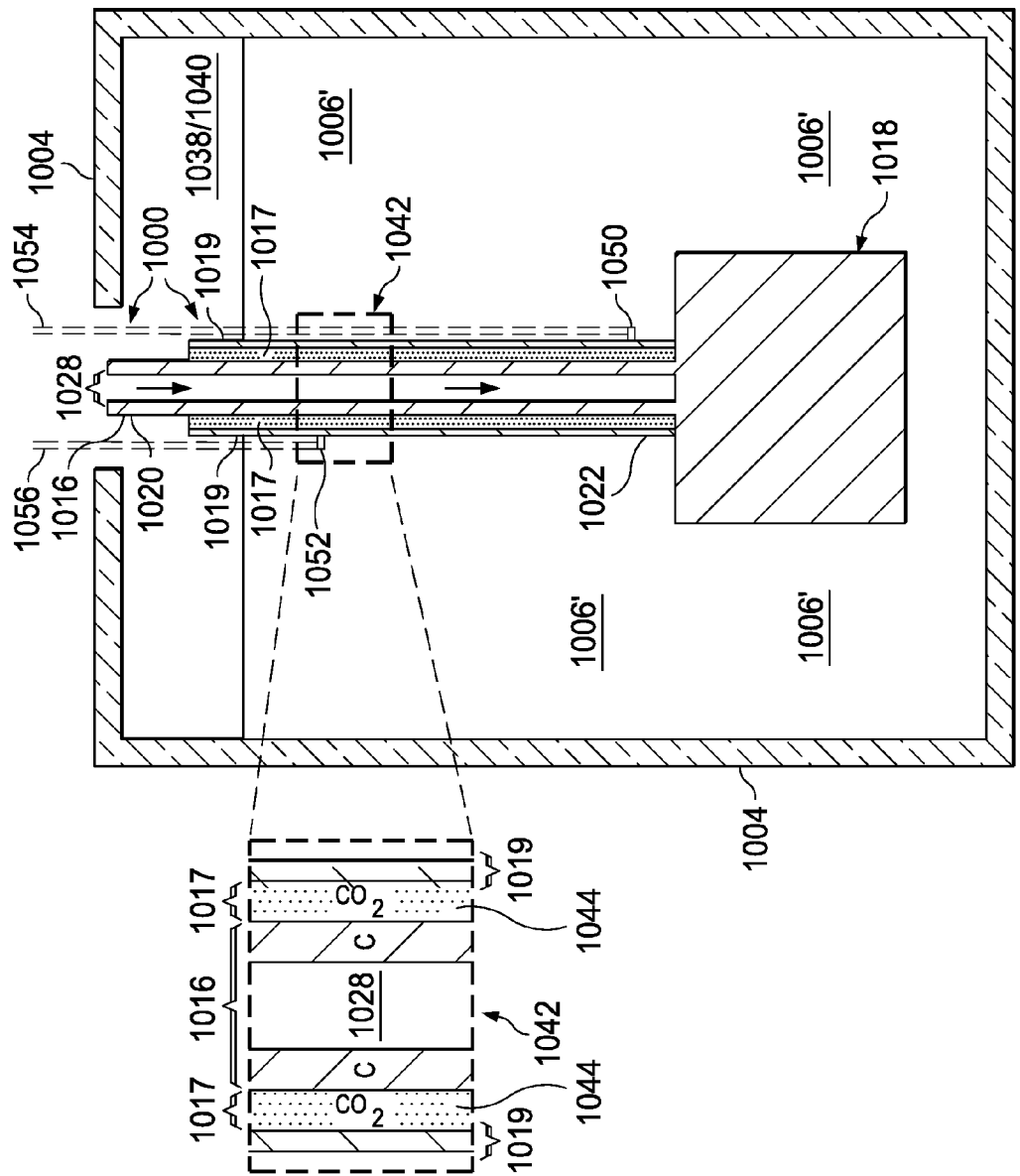
FIG. 10 is a diagram used to describe a device (e.g., stirrer, thermocouple, level probe) which is configured to be partially inserted into molten glass in accordance with yet another embodiment of the present invention.

Referring to FIG. 10, there is illustrated a device 1000 which is configured to be partially inserted into molten glass 1006 in accordance with yet another embodiment of the present invention. The device 1000 is located in a vessel 1004 which contains molten glass 1006. The device 1000 includes a section 1016 (which is contaminated with for instance carbon) and a component 1018 (e.g., stirrer blades 1018, thermocouple 1018, level probe 1018) which are attached to one another. The contaminated section 1016 has one end 1020 a portion of which is extending above the molten glass 1006 and a second end 1022 which is located in the molten glass 1006 and attached to the component 1018. In this example, the contaminated section 1016 is shown having a hole 1028 formed therein which could for instance be used as a wire way. Alternatively, the contaminated section 1016 could be solid. The device 1000 has at least a portion of the contaminated section 1000 wrapped with a mesh 1017 (e.g., platinum mesh 1017, gas permeable structure 1017) and then a non-contaminated cladding 1019 (e.g., platinum-rhodium cladding 1019, stainless steel cladding 1019, high temperature alloy cladding 1019 (e.g., inconnel cladding 1019)) is wrapped around the mesh 1017. The section's mesh 1017 and non-contaminated cladding 1019 would extend above the molten glass 1006 and be open to an ambient atmosphere 1038 or a combustion atmosphere 1040 in the vessel 1004. This atmosphere 1038 or 1040 would contain some level of oxygen. By diffusion and convection, this atmosphere 1038 or 1040 would fill the void area that the mesh 1017 makes between the contaminated section 1016 and the non-contaminated cladding 1019. The contact of the ambient or combusion atmosphere 1038 or 1040 with the exposed surface of the contaminated section 1016 would cause the oxidation of the carbon (C) in the contaminated section 1016 (see expanded view 1042). This oxidation reaction would form $CO_2$ gas 1044 which would harmlessly diffuse out of this area into the ambient or combustion atmosphere 1038 or 1040 rather than into the molten glass 1006. The $CO_2$ gas 1044 formed would not cause blisters in the molten glass 1006. Plus, the formed $CO_2$ gas 1044 would not contaminate the cladding 1019 because for carbon (C) to adversely affect the metal cladding 1019 (precious metal cladding 1019) it must be in the reduced or elemental form. If desired, the device 1000 may contain an optional input port 1050 and an optional output port 1052 both of which would extend through the cladding 1019. The optional input port 1050 would be connected to non-contaminated tubing 1054 through which a gas (e.g., air) would flow to assist in the removal of the $CO_2$ gas 1044 from the mesh 1017. The optional output port 1052 would be connected to non-contaminated tubing 1056 through which the gas (e.g., air) and $CO_2$ gas 1044 would flow from the mesh 1017.

Although several embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims.

The invention claimed is:

1. A method for producing a glass article, the method comprising the steps of:
   flowing molten glass through a glass manufacturing vessel that comprises:
      an external metal layer with a first side and a second side;
      an intermediate layer; and
      an internal metal layer with a first side and a second side, where the intermediate layer is positioned between and in contact with the second side of the external layer and the first side of the internal layer, where the intermediate layer has a gas permeable structure that permits an atmosphere of gas to pass therein between the second side of the external layer and the first side of the internal layer, and where the intermediate layer is a metal mesh screen; and
   supplying the atmosphere of gas to the intermediate layer of the glass manufacturing vessel.

2. The method of claim 1, where the second side of the internal layer contacts the molten glass.

3. The method of claim 1, where the supply step further comprises creating the atmosphere of gas that maintains a positive pressure within open spaces of the intermediate layer and suppresses blister formation within the molten glass.

4. The method of claim 1, where the external layer has at one location an input port extending through the first side and the second side thereof.

5. The method of claim 4, where the external layer has at another location an output port extending through the first side and the second side thereof.

6. The method of claim 1, where the external layer is a metal sheet.

7. The method of claim 1, where the internal layer is a metal sheet.

8. The method of claim 1, where the external layer and the internal layer are dissimilar metals.

9. The method of claim 1, wherein the internal layer is laminated to one or both of the first side of the internal layer or the second side of the external layer.

10. A method for producing a glass sheet, the method comprising the steps of:
    melting, within a melting vessel, glass batch materials to form molten glass;
    removing, within a fining vessel, bubbles from the molten glass, where the melting vessel is connected to the fining vessel by a melting to fining tube;
    mixing, within a stir chamber, the molten glass, where the stir chamber is connected to the fining vessel by a finer to stir chamber tube;
    receiving, at a bowl, the molten glass, where the bowl is connected to the stir chamber by a stir chamber to bowl connecting tube;
    receiving, at a downcomer, the molten glass, where the downcomer is connected to the bowl;
    delivering, to an inlet, the molten glass, where the inlet is associated with the down comer;
    delivering, to a forming apparatus, the molten glass, where the forming apparatus is connected to the inlet;
    forming, at the forming apparatus, a glass sheet from the molten glass;
    wherein at least one of the melting to fining tube, the fining vessel, the finer to stir chamber tube, the stir chamber, the stir chamber to bowl connecting tube, the bowl, the downcomer,
    and wherein the inlet further comprises:
       an external metal layer with a first side and a second side;
       an intermediate layer; and
       an internal metal layer with a first side and a second side, where the intermediate layer is positioned between and in contact with the second side of the external layer and the first side of the internal layer, where the intermediate layer has a gas permeable structure that permits an atmosphere of gas to pass therein between the second side of the external layer and the first side of the internal layer, and where the intermediate layer is a metal mesh screen; and
    supplying, from a control system, the atmosphere of gas to the intermediate layer of the at least one of the melting to fining tube, the fining vessel, the finer to stir chamber tube, the stir chamber, the stir chamber to bowl connecting tube, the bowl, the downcomer, and the inlet.

11. The method of claim 10, where the external layer has at one location an input port extending through the first side and the second side thereof.

12. The method of claim 11, where the external layer has at another location an output port extending through the first side and the second side thereof.

13. The method of claim 10, where the external layer is a metal sheet.

14. The method of claim 10, where the internal layer is a metal sheet.

15. The method of claim 10, where the external layer and the internal layer are dissimilar metals.

16. The method of claim 10, where the second side of the internal layer contacts the molten glass.

17. The method of claim 10, where the supply step further comprises creating the atmosphere of gas that maintains a positive pressure within open spaces of the intermediate layer and suppresses blister formation within the molten glass.

18. The method of claim 10, wherein the internal layer is laminated to one or both of the first side of the internal layer or the second side of the external layer.

* * * * *